United States Patent [19]

Palfery et al.

[11] Patent Number: 4,571,814
[45] Date of Patent: Feb. 25, 1986

[54] AUTOMATED MACHINING SYSTEM

[76] Inventors: Kenneth J. Palfery, 38 Berl Ave., Toronto 18, Ontario MY83C4; Kenrick B. Maharaj, 6 Linkdale Rd., Brampton, Ontario L6V2Y4, both of Canada

[21] Appl. No.: 681,802

[22] Filed: Dec. 14, 1984

[51] Int. Cl.⁴ ............................................. B23Q 3/157
[52] U.S. Cl. ..................................................... 29/568
[58] Field of Search .............. 29/568, 26 A, 563, 561; 414/783, 758, 763, 729, 738; 901/6, 41; 409/227, 218; 192/54, 55

[56] References Cited

U.S. PATENT DOCUMENTS

| | | | |
|---|---|---|---|
| 4,042,122 | 8/1977 | Epsy et al. | 414/783 X |
| 4,090,287 | 5/1978 | Selander | 29/568 |
| 4,348,623 | 9/1982 | Kobayashi | 901/6 X |

FOREIGN PATENT DOCUMENTS 112753  8/1980  Japan ..................... 29/568

Primary Examiner—William R. Briggs

[57] ABSTRACT

There is provided by this invention an automated machining center having a multitude of integrated functions. These functions include automatically loading and unloading a workpiece from a stack of material, securing the workpiece to the worktable in preparation for a machining function, rotating the workpiece, releasing the workpiece and removing the workpiece from the machining area, and finally selecting a new workpiece from a stack of material.

7 Claims, 13 Drawing Figures

AUTOMATED MACHINING SYSTEM

BACKGROUND OF THE INVENTION

1. Field of the Invention

This invention relates generally to automatic machine tools programmable to perform multiple machining functions on a workpiece, and more particularly, to automatic machine tools having loading and unloading devices, automatic workpiece turnover means, and automatic operation of a multitude of machining functions incorporated in a completely integrated system.

2. Description of the Prior Art

Automated machine tools are well-known in the art, that perform a variety of cutting functions such as milling, drilling, threading, tapping, etc. on a workpiece. These machines are normally provided with a tool carrousel that has numerous cutting tools mounted thereon for performing the variety of functions of the machine. The tool holder is generally a rotatable tool spindle mounted in a drill head which is adjustably mounted on a vertical column or quill for vertical movement. The tool spindle is mounted for rotation relative to the quill and is moveable axially with respect to the drill head. Additionally, the workpiece is secured to a worktable that is moveable in a x-y horizontal plane for providing a variety of positions to perform the various cutting operations.

The machining operation is performed by the rotatable tool spindle rotatably mounted in a spindle head and arranged to be shifted vertically with respect to the workpiece. Precision cutting is performed, such that a hole center may be precisely located with respect to the axis of the rotatable tool spindle and the combined movement of the worktable in its horizontal plane of movement. During the machining operation, the spindle is rotated at a pre-selected cutting speed and is feed downwardly by the drill head on the quill at a predetermined feed rate. The cutting tool is removably mounted in a chuck which is supported by the lower end of the rotatable tool spindle, and forms a part thereof. Additionally, a tool changer is adapted to remove the used tool from the chuck at the end of a cutting operation and replace the used tool with a pre-selected new tool in an automatic manner that eliminates lost time associated with manual tool changing operations.

All of these machine functions are carried out in rapid efficient manner in order to bring about the most efficient operation of the machine tool. The automatic control of the machine tool is provided by a numerical control system operating under the control of a punched tape or other memory device which regulates the table so as to locate a cutting center with respect to the axis of the tool, the automatic selection of the spindle speed, the spindle feed rate on the quill, and other machine functions.

Automatic loading or unloading features, and part turnover are usually not provided in automatic machine tools. It is often feasible to clamp the workpiece in a fixture outside of the machining area and slide it on rails into machining position after clamping. Also, after the workpiece is in machine position, present automated machine tools do not have the capability to rotate the part for additional machining.

It would be desirable if an automatic machine had the capability to select a workpiece from a stack of material and completely perform all machining functions. These functions should include unloading the workpiece from a stack of material, securing the workpiece to the worktable in preparation for a machining function, cleaning off scrap chips, rotating the workpiece, drilling holes at any angle, turning the workpiece over 180°, performing a variety of automated machining functions, releasing the workpiece from the worktable, removing the workpiece from the machining area, and finally selecting a new workpiece from a stack of material.

Such a machine tool having a much greater degree of automation is a completely integrated system and provides much more efficiency in machining operations without manual intervention.

SUMMARY OF THE INVENTION

There is provided by this invention, a completely integrated machine tool that performs a variety of machining functions on a workpiece without human intervention. The machine tool has the additional capability to select a workpiece from a stack of material, secure the workpiece to the worktable, perform all necessary machining functions required on the workpiece, detach the workpiece from the worktable, and unload the finished and machined workpiece from the machine tool.

Other inventive features of this machine tool include a workpiece turnover means for detaching the workpiece from the worktable, turning the workpiece over, and again securing the workpiece to the worktable. Another object of this invention is to provide a rotating indexing means mounted to the movable worktable for rotating the workpiece 360° in a horizontal plane.

New tooling functions are also provided, which includes a torque adjustable screwdriver for attaching bolts to the workpiece for securing the workpiece to the worktable and subsequently removing the bolts from the workpiece when the workpiece has to be unloaded from the worktable. Additionally, a right angle drill is provided with the capability to drill the workpiece at a right angle to the spindle axis.

BRIEF DESCRIPTION OF THE DRAWINGS

Referring to FIG. 1, there is shown a layout of an automated machine tool 10. The machine tool 10 is generally comprised of a frame 12, having mounted thereon a movable bed 14 that is disposed to move longitudinally and latitudinally in a horizontal plane. Mounted on the movable bed 14 is an elongated trunnion worktable 16 that is pivotally supported at each end by support structures 18 and 20 so that the worktable may be rotated about its horizontal axis by means of a drive motor 22. The trunnion work table is extended to allow the machining of large parts. A hydraulic brake 24 is mounted on the support 20 and actuated to apply friction braking to stop rotation of the trunnion worktable 16 at a desired position. Rotation of the trunnion worktable 16 about its horizontal axis allows precision angular cutting to be performed on a workpiece with respect to the vertical axis of a cutting tool. Additionally, a workpiece may be machined by rotation of the trunnion worktable 16 simultaneously with x-y movements of the table in its horizontal plane. A drive head indicated generally at 26 is mounted to the support frame 12 and is disposed to move in a vertical direction by means of a quill-type shaft not shown but well-known in the art. Supported at the end of the drive head 26, is a spindle 28 that holds a machine cutting tool 30. The drive head 26 is disposed to rotate the spindle 28 and the cutting tool 30 at a fixed speed rate to cut and machine a workpiece 32 that is mounted to the worktable 16. A tool changing carrousel 34, is also supported on a support frame 12 in close proximity to the drill head 26 to store a multitude of different cutting tools that can be supported in the spindle 28 to perform different machining operations on the workpiece 32. When it is desired to change the cutting tool to perform a different machining operation, a tool changing arm 36 detaches the tool 30 from the spindle 28, returns the used tool to the tool changing carrousel 34, removes a new tool from the tool changing carrousel, and inserts it into the rotatable spindle 28 to perform a new machining operation.

The various automatic machining functions and precise alignment of the machine tool 10 are controlled by a programmable control unit 38. The programmable control unit 38 may be a numerical control system with its programs stored on a punched tape or other memory devices. The programmable control unit 38 in addition to performing other functions that will be later described controls the movement of the trunnion worktable in a horizontal plane, the rotation of the trunnion worktable about its horizontal axis, the speed rate of the rotatable spindle, and the automatic operation of the tool changing arm to detach a used tool from the rotatable spindle and exchange it with a tool stored in the tool changing carrousel.

Mounted on the trunnion worktable 16 is a material handling system generally indicated at 40. The material handling system is generally of the type disclosed in the co-pending U.S. patent application Ser. No. 06/681,794, filed Dec. 14, 1984, assigned to the assignee of the instant application. Inasmuch as the material handling system is of the type disclosed in the aforementioned patent to which reference is made to incorporate herein the complete description of structure and operation, the following description is limited to those portions essential to the present invention.

Figure 1:
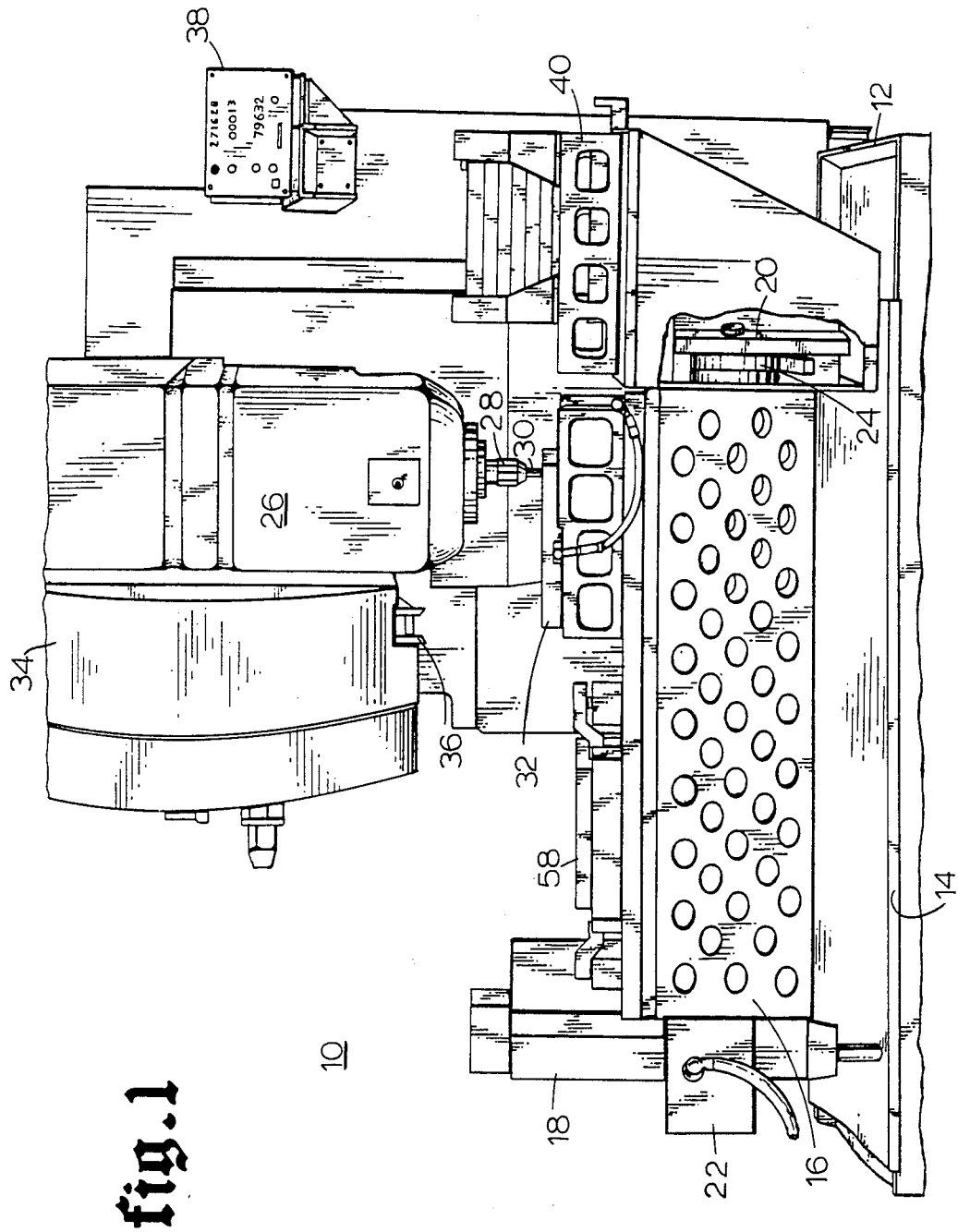
FIG. 1 is a perspective view of an automatic machine tool incorporating the principles of this invention.
Figure 2:
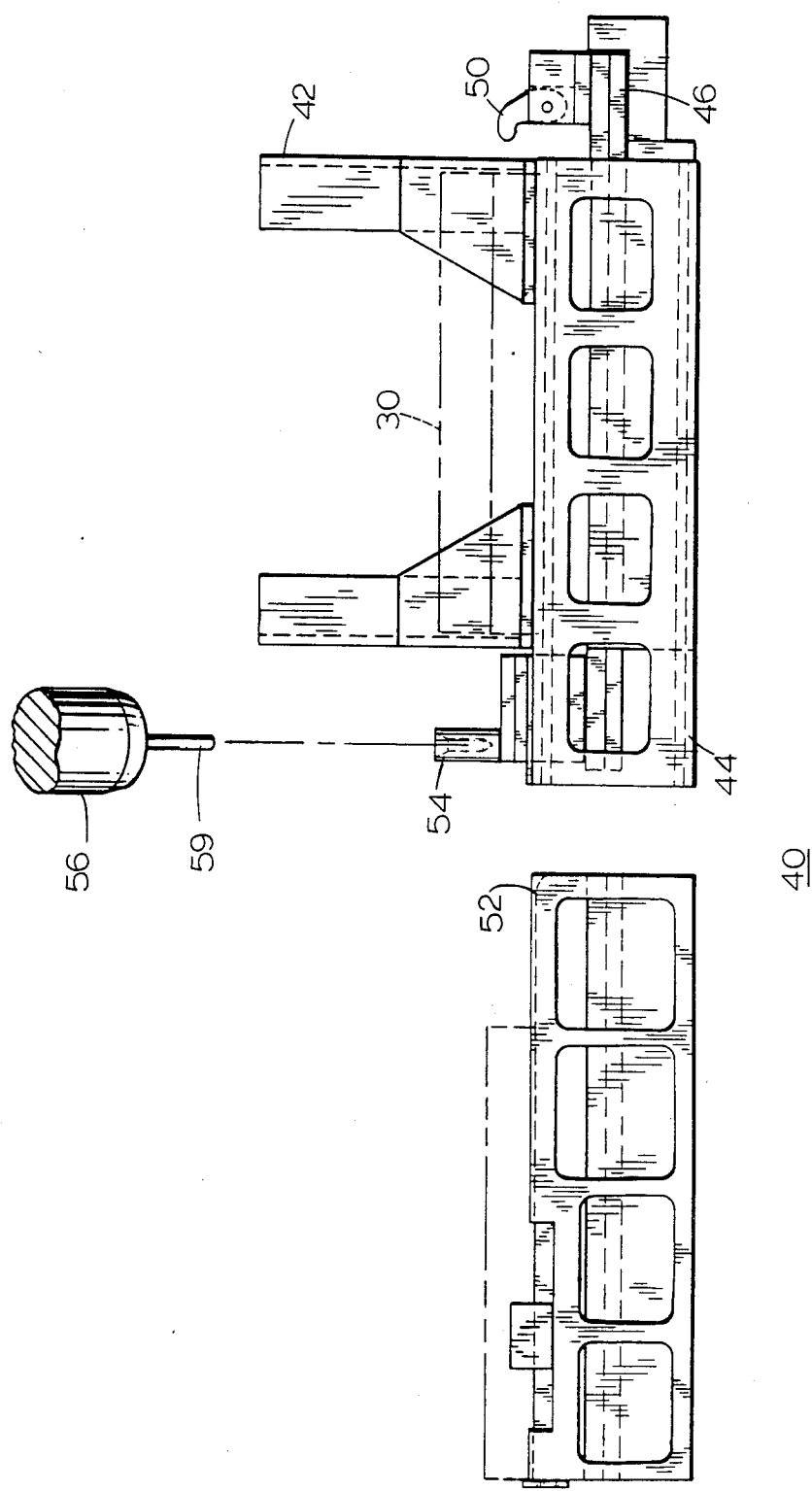
FIG. 2 is a detailed front view of the material transfer apparatus shown in FIG. 1.
Figure 3:
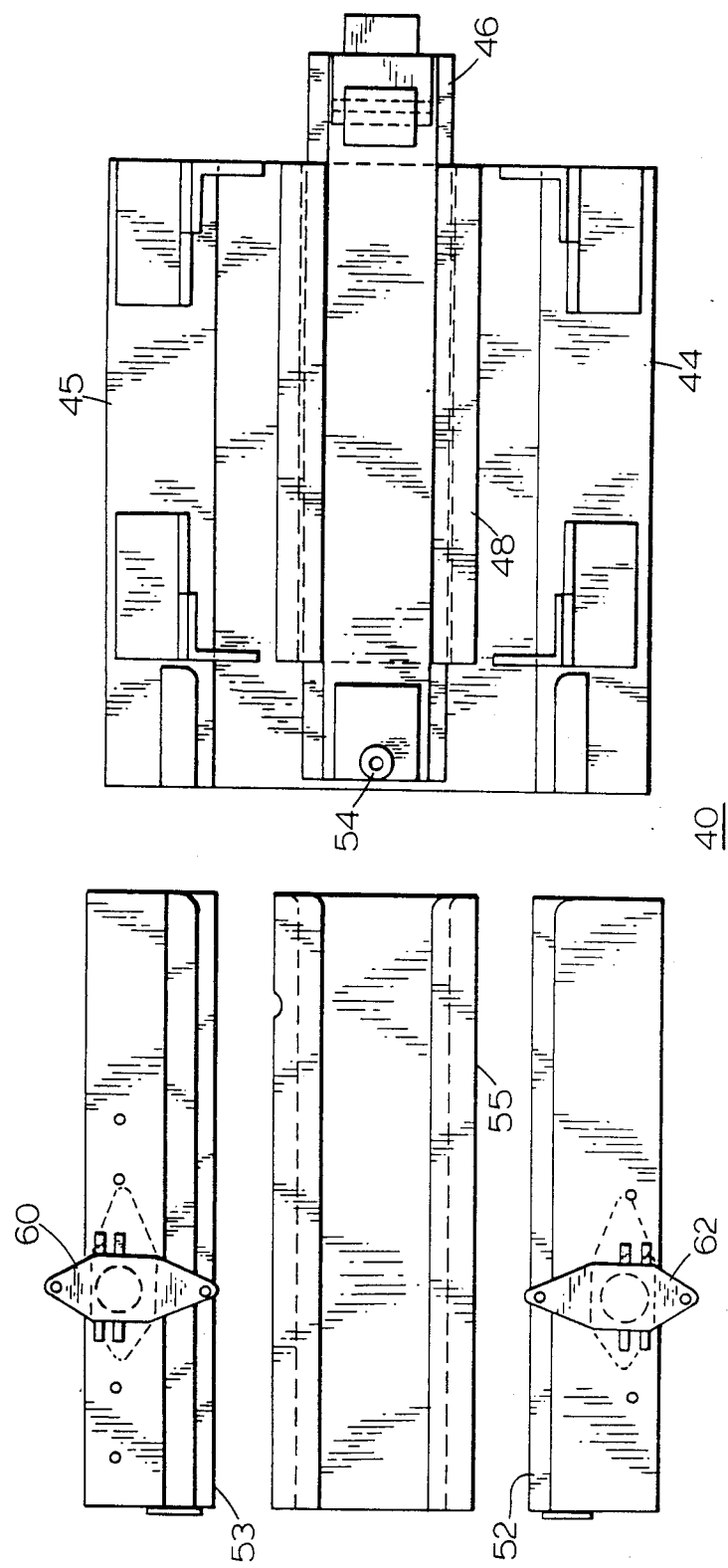
FIG. 3 is a detailed top view of FIG. 2.

Referring to FIGS. 2 and 3, the material transfer system is generally comprised of a storage bin 42 that contains a stack of raw material to be machined and is mounted on a pair of guide rails 44 and 45. A shuttle arm 46 is located generally between the pair of guide rails 44 and 45 beneath the storage bin 42 on a track 48 for movement thereon. An indexing lever 50 is pivotally mounted and spring biased on the shuttle arm 46 and is disposed to move the lowermost workpiece 30 from the stack of raw material along the first pair of guide rails 44 and 45 onto a second pair of guide rails 52 and 53. The guide rails 52 and 53 also have a track 55 located generally between them that supports the shuttle arm 46. The workpiece 30 is clamped in position by clamps 60 and 62. A latching pin 54 is connected to the shuttle arm 46 to facilitate movement of the shuttle arm over the tracks 48 and 55. The latching pin 54 has an aperture therein designed to interconnect with an indexing tool 56 during loading operation in a manner hereinafter described. The indexing tool 56 can be stored in the tool changing carrousel 34 and mounted in the rotatable spindle 28.

The machining operation of the automated machine tool 10 begins with unloading a workpiece from the stack of raw material in the storage bin 42. This is accomplished by first retrieving the indexing tool 56 from the tool changing carrousel 34 and inserting it into the rotatable spindle 28. The indexing tool 56 has a tool head designed to mount in the rotatable spindle and an elongated shaft 59 connected to the tool head. The trunnion worktable 16, which is moveable in a horizontal plane is positioned such that the centerline of the aperture in the latching pin 54 is aligned with the axis of the indexing tool 56 that is mounted in the rotatable spindle 28. Rotation of the spindle is not necessary for the use of the indexing tool 56. The drive head 26 is then lowered on the quill vertically such that the shaft 59 of the indexing tool 56 is inserted into the aperture of the latching pin 54. The trunnion worktable 16 is then moved in a straight line motion lengthwise such that the shuttle arm 46 is pulled along the tracks 48 and 55 and the indexing lever 50 pushes a workpiece along the guide rails 44 and 45 from the storage bin 42 onto the second set of guide rails 52 and 53. Once in position on the second set of guide rails 52 and 53, hydraulic clamps 60 and 62 clamp the workpiece into position. The tool changing arm 34 then detaches the indexing tool 56 from the rotatable spindle 28 and exchanges it with a drill stored in the tool changing carrousel 34. The machine tool then drills two or more apertures 33 in the workpiece 32 that will be used later to secure the workpiece to a rotary indexing table 58 hereinafter described.

Figure 4:
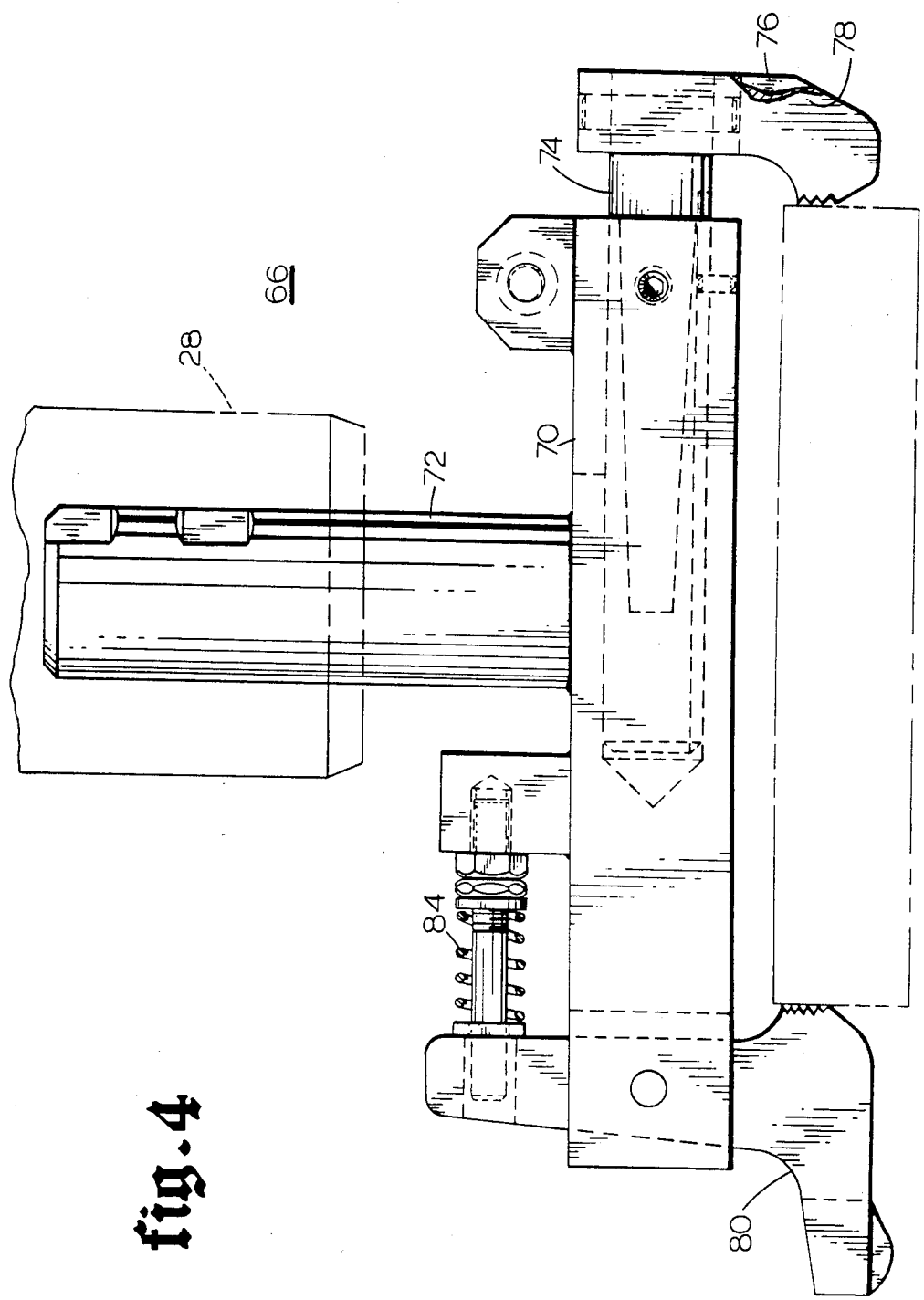
FIG. 4 is a detailed front view of the workpiece pickup attachment.
Figure 5:
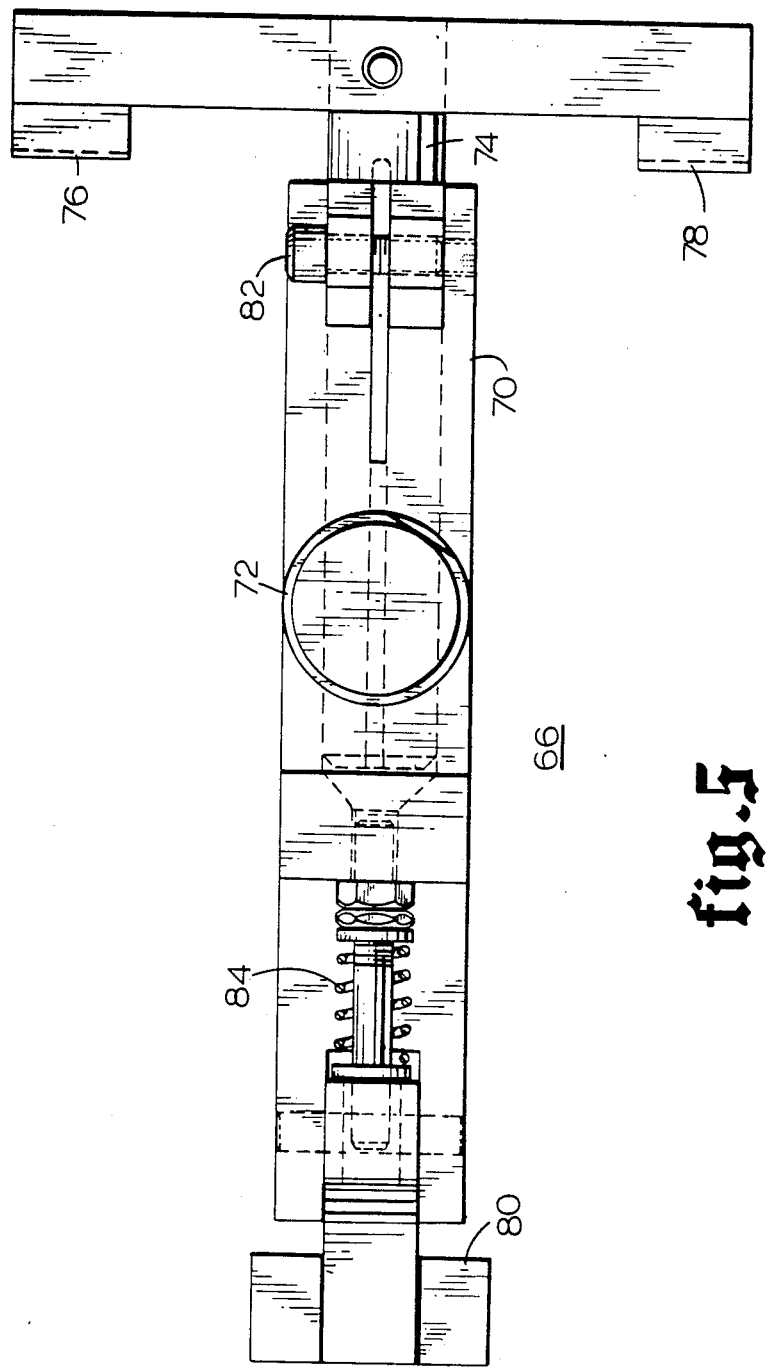
FIG. 5 is a detailed top view of FIG. 4.

After the initial machining has been performed on the guide rails 52, it is necessary to transfer the workpiece 30 to the rotary indexing table 58 to be machined. To accomplish the transfer, a workpiece pickup attachment 66 shown in FIGS. 4 and 5 is utilized which is normally stored in the tool changing carrousel 34. Upon command of the programmable control unit, the tool changing arm 36 retrieves the workpiece pickup attachment 66 and inserts it into the rotatable spindle 28. The workpiece pickup attachment 66 is generally a three point pickup assembly having three separated gripper pads, one of which is spring loaded to provide the necessary gripping force to lift the material while the other two are fixed to accommodate varying sizes of material to be handled.

Figure 6:
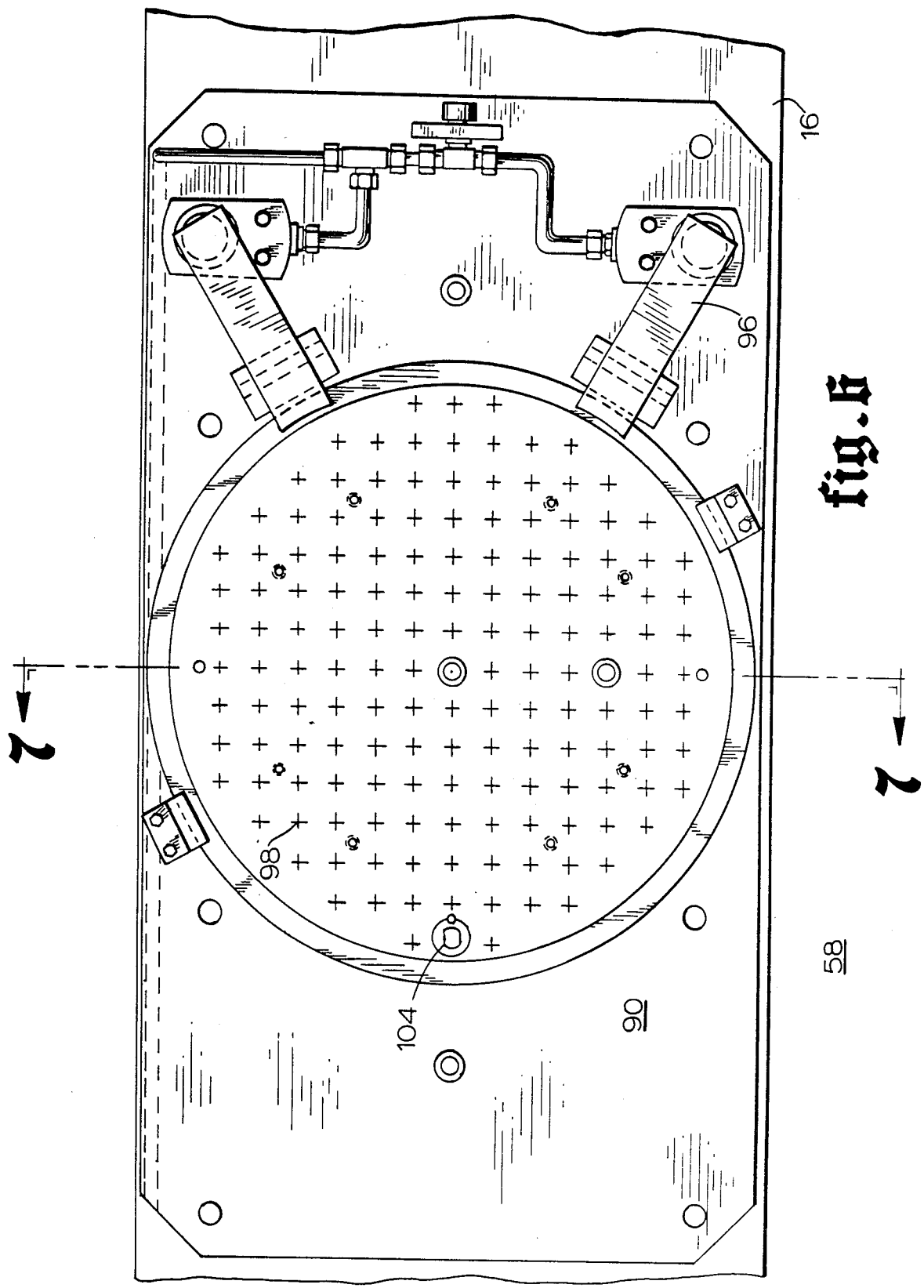
FIG. 6 is a detailed top view of the rotary indexing table shown in FIG. 1.

Referring to FIG. 6, the workpiece pickup attachment is comprised of a generally hollow support member 70 having connected thereto a chuck 72 that is disposed to be connected to the rotatable spindle 28 for support thereby. Inserted in the support member 70 is a telescoping member 74 that has attached at one end two gripper pads 76 and 78. Also connected to the support 70 is a gripper pad 80 pivotally connected and spring biased. A locking nut 82 is provided to lock the telescoping member 74 to restrict movement within the support member 70 to set the distance between the gripper pads 76, 78, and 80 for accommodating various sizes of stock material. A spring 84 biases the gripper pad 80 to maintain pressure on stock material in combination with the gripper pads 76 and 78. Once the workpiece pickup attachment 66 is mounted in the rotatable spindle 28, the drill head is then lowered until the gripper pads make contact with the workpiece such that the gripper pad 80 is pivoted against the biasing of the spring 84 and the workpiece is contained between the gripper pads 76, 78, and 80 supported by the pressure applied by the spring 84. The drill head 26 then raises vertically, carrying the workpiece within the workpiece pickup attachment 66 and the trunnion worktable 16 moves in its horizontal Plane to a preprogrammed position until the workpiece is located just above the rotary indexing table 58. When the predetermined position is reached, the drill head 26 then lowers the workpiece to the rotary indexing table 58.

The rotary indexing table 58 is generally of the type disclosed in the co-pending U.S. patent application Ser. No. 06/681,793, filed Dec. 14, 1984, assigned to the assignee of the instant application. Inasmuch as the rotary indexing table 58 is of the type disclosed in the aforementioned patent to which reference is made to incorporate herein the complete description of structure and operation, the following description is limited to those portions essential to the present invention.

Figure 7:
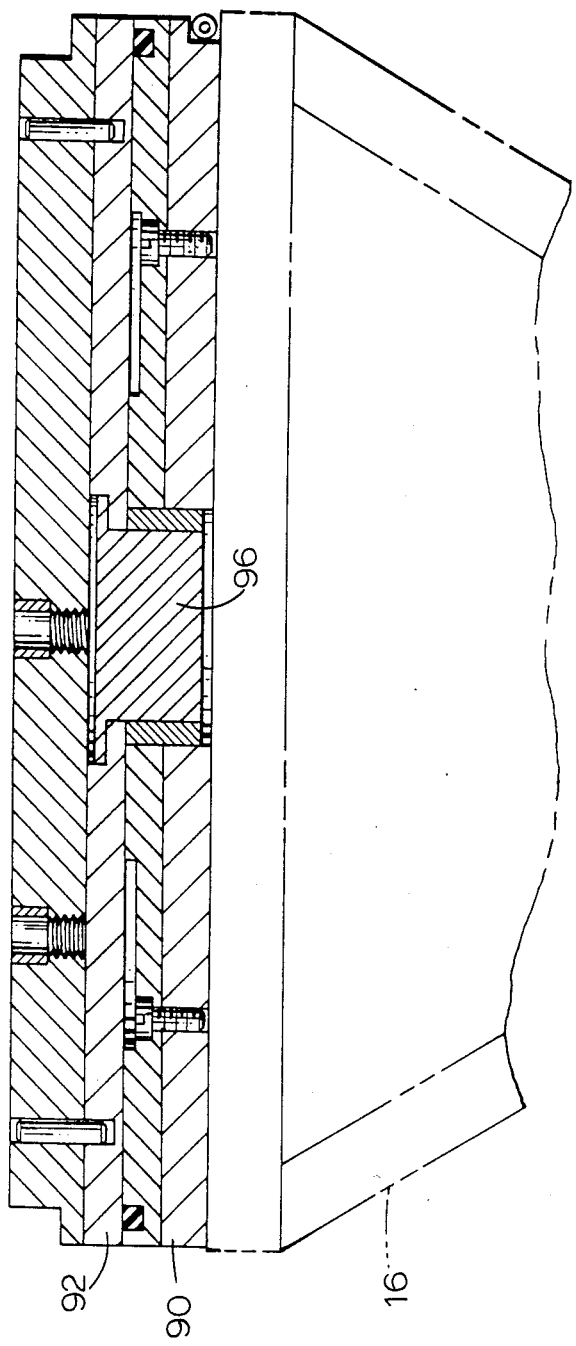
FIG. 7 is a view taken generally along the lines VII—VII of FIG. 6.
Figure 8:
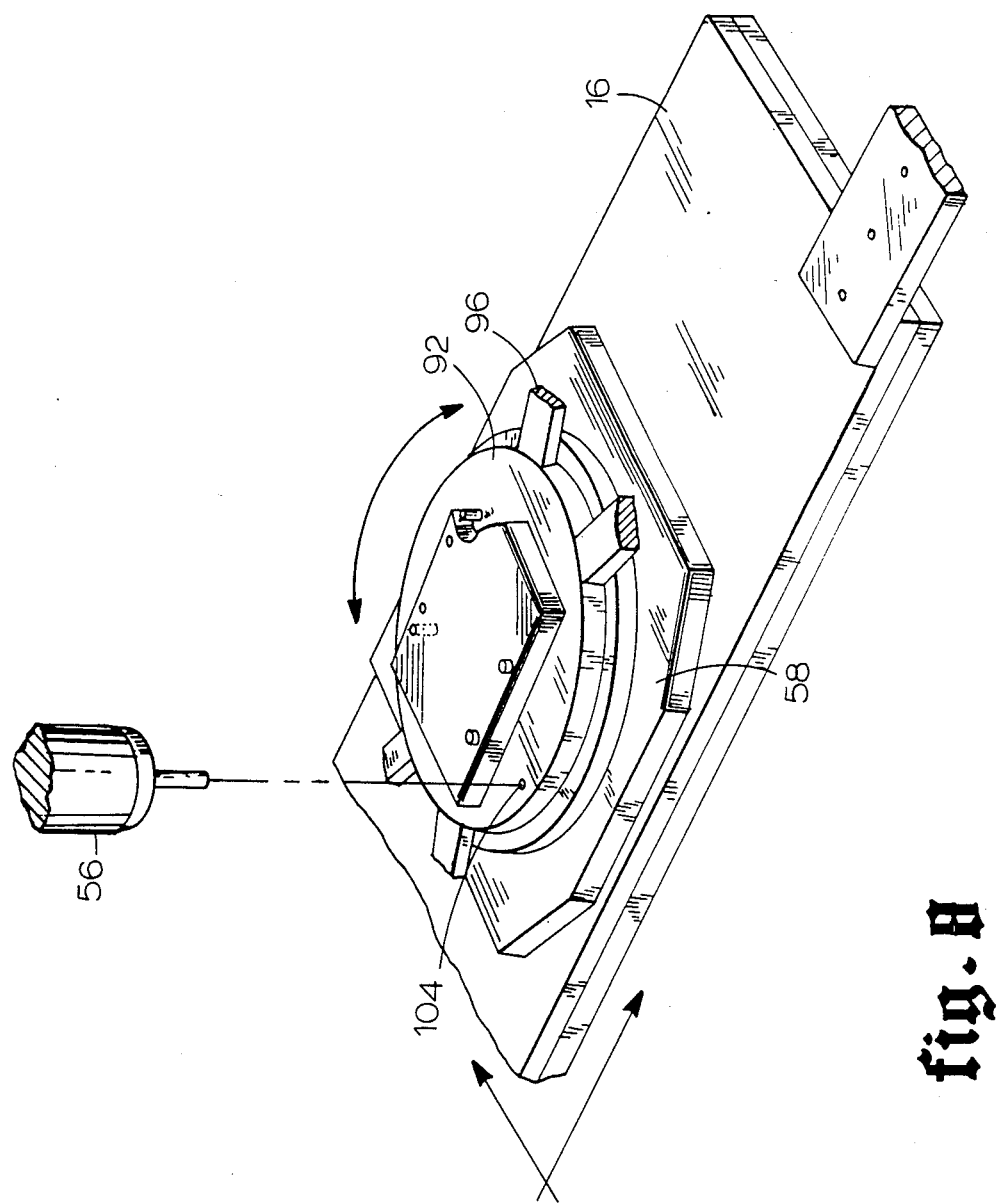
FIG. 8 is a perspective view of the rotary indexing table incorporating the principles of this invention.

Once the workpiece pickup attachment 66 releases the workpiece onto the rotary indexing table, the workpiece pickup attachment is then returned to the tool changing carrousel 34. Referring to FIGS. 6, 7, and 8, the rotary indexing table 58 is generally comprised of a baseplate assembly 90 upon which is mounted a circular table 92 that rotates about a center pin 94 that is part of the baseplate assembly 90. Four automatic machine operated hydraulic clamps such as 96 are spaced around the periphery of the circular table 92 to lock it in position. The circular table 92 has a multitude of threaded apertures 98 by which the workpiece may be bolted thereto. An adjustable torque driver 102 to be hereinafter described is retrieved from the tool changing carrousel 34 and inserted into the rotatable spindle 28 to bolt the workpiece to the rotary indexing table 58 for machining using the apertures 98. The workpiece is now ready for a variety of machining functions which may be accomplished by exchanging different tools in the tool changing carrousel 34 with the one supported in the rotatable spindle 28. If it is desired to rotate the workpiece to a different orientation on the trunnion worktable 16, the indexing tool 56 is inserted into the rotatable spindle 28 and positioned into an indexing aperture 104 provided in the circular table 92. The hydraulic clamps 96 are then released and the trunnion worktable 16 makes appropriate x-y table movements within its horizontal plane that results in the indexing tool 56 causing rotation of the rotary indexing table 58 to a desired position. The hydraulic clamps 96 are then actuated to clamp the indexing table in its new position.

Figure 9:
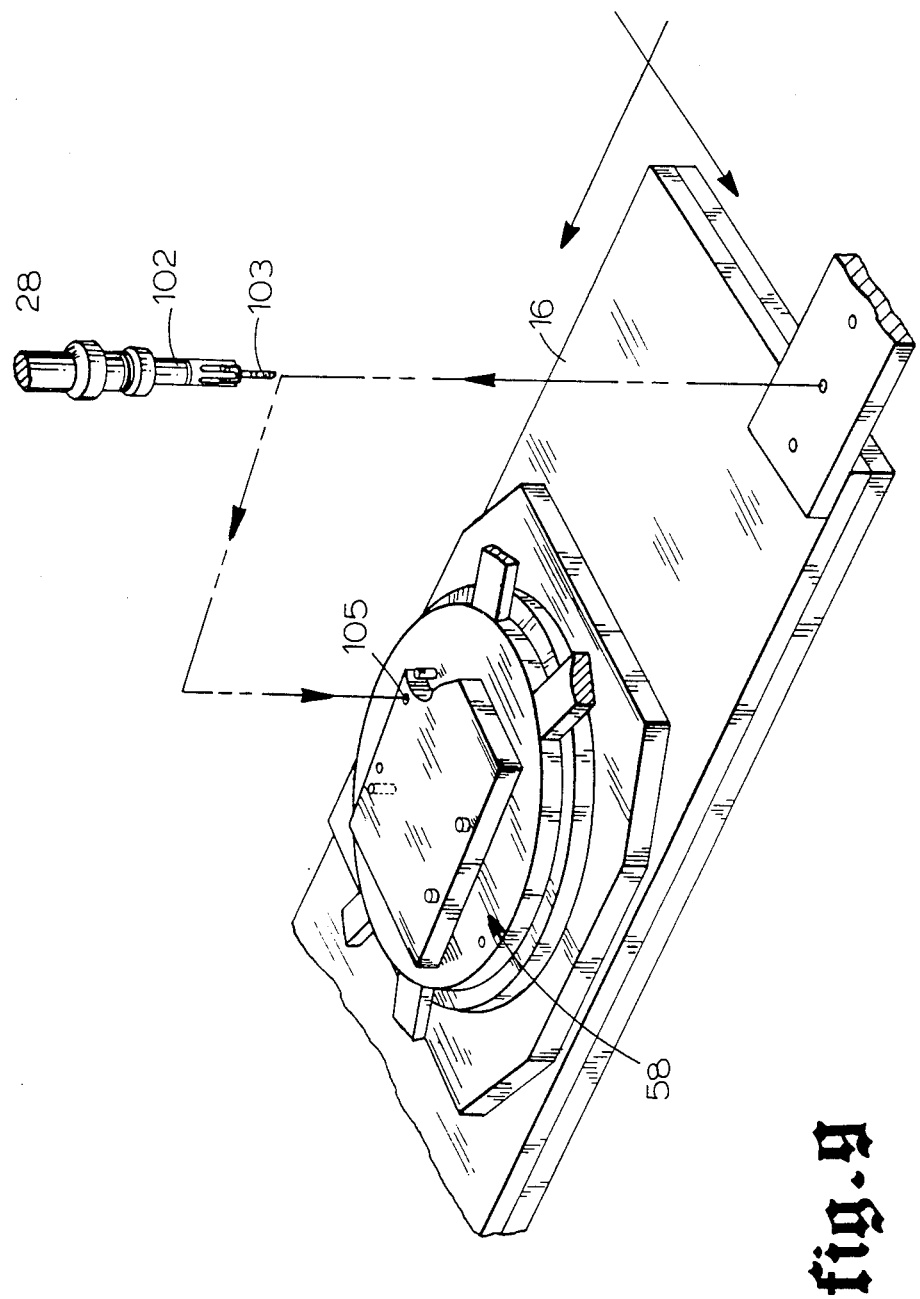
FIG. 9 is a perspective view of the adjustable torque driver incorporating the principles of this invention.

For normal machining operations, it is necessary to adequately secure the workpiece to the rotary indexing table 58 as previously described. An adjustable torque driver 102 shown in FIG. 9 designed to fit in the tool changing carrousel 34 is transferred to the rotatable spindle 28. Under the control of the programmable control unit 38, the trunnion worktable 16 moves to a position where bolts 103 are stored on its surface and the adjustable torque driver 102 is lowered by the drive head 26 to grip the bolt 103 and then rotates the rotatable spindle 28 to remove the bolt 103 from the worktable. The trunnion worktable 16 then moves to a position where the axis of the bolt 103 held by the adjustable torque driver 102 is vertically aligned with previously drilled apertures 105 in the workpiece and apertures 98 of the rotary indexing table 58. The drill head lowers the adjustable torque driver 102 to insert the bolt into the apertures 105 and 98. The spindle 28 rotates the adjustable torque driver 102 and tightens the bolt to secure the workpiece to the rotary indexing table for machining. Later the adjustable torque driver 102 removes the bolt 103 under the program control and returns it to the trunnion worktable 16 for storing. The adjustable torque driver 102 is generally of the type disclosed in the co-pending U.S. patent application Ser. No. 06/681,792, filed Dec. 14, 1984, assigned to the assignee of the instant application. Inasmuch as the adjustable torque driver 102 is of the type disclosed in the aforementioned patent to which reference is made to incorporate herein the complete description of structure and operation, the following description is limited to those portions essential to the present invention.

Figure 10:
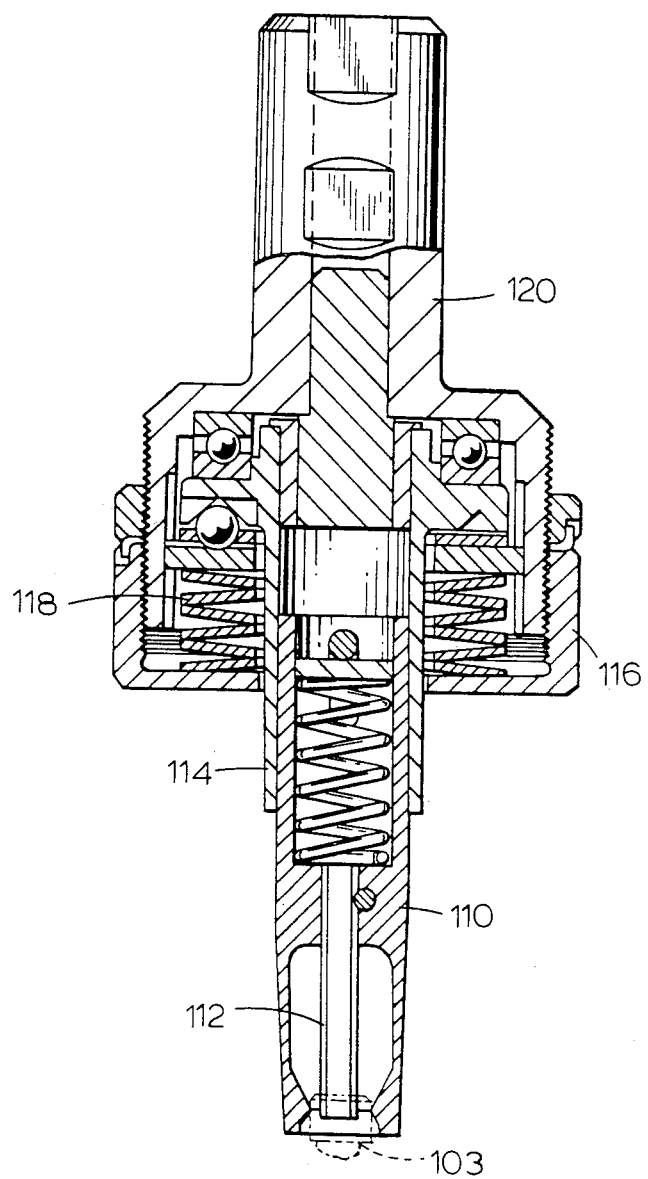
FIG. 10 is a sectional view of the adjustable torque driver.

As can be seen in FIG. 10, the adjustable torque driver 102 consists of a slotted steel sleeve 110 and a hexagon drive bit 112, both of which are attached to an adjustable torque release assembly 114. The torque is controlled by setting an adjusting sleeve 116 to compress a spring 118 that biases the adjustable torque release assembly 114 into engagement with a tool head 120. The tool head 120 mounts in the rotatable spindle 28 and is rotated at a fixed speed rate. When the torque applied to the bolt 103 exceeds the biasing of the spring 118, the spring is compressed by the adjustable torque release assembly 114. Applied torque in excess of the compression force of the spring 118 causes the assemble 114 to slip and disengage from the tool head 120. The tool head 120 continues to rotate at the rotating spindle speed, however additional torque is prevented from being applied to the bolt due to the slip of the adjustable torque release assembly 114. The bolts 103 may be removed from the workpiece by reversing the drive action of the rotatable spindle 28.

Figure 11:
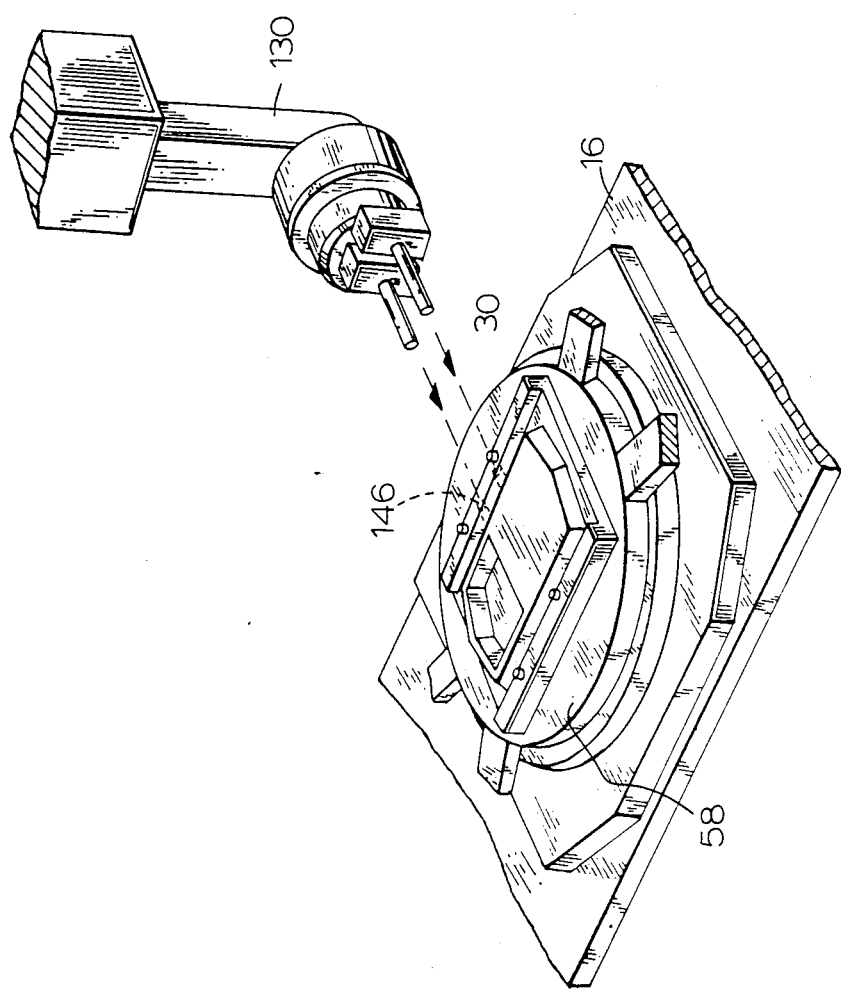
FIG. 11 is a perspective view of the workpiece turnover attachment incorporating the principles of this invention.

Referring to FIG. 11, when it is necessary to turn the workpiece 30 over for additional machining, the workpiece is released from the rotary indexing table 58 by the adjustable torque driver 102 as previously described. A workpiece turnover attachment 130 that is designed to be stored in the tool changing carrousel 34 is transferred to the rotatable spindle 28 and is operated by a programmed rotation of the spindle. The workpiece turnover attachment 130 has two nose pins which are inserted into pre-drilled holes of the workpiece. The workpiece turnover attachment 130 raises the workpiece from the rotary indexing table 58 by means of the drive head 26, rotates the workpiece 180 degrees, and returns the workpiece to worktable for machining on the opposite side.

The workpiece turnover attachment 130 is generally of the type disclosed in the co-pending U.S. patent application Ser. No. 06/681,906, filed Dec. 14, 1984, assigned to the assignee of the instant application. Inasmuch as the workpiece turnover attachment 130 is of the type disclosed in the aforementioned patent to which reference is made to incorporate herein the complete description of structure and operation, the following description is limited to those portions essential to the present invention.

Figure 12:
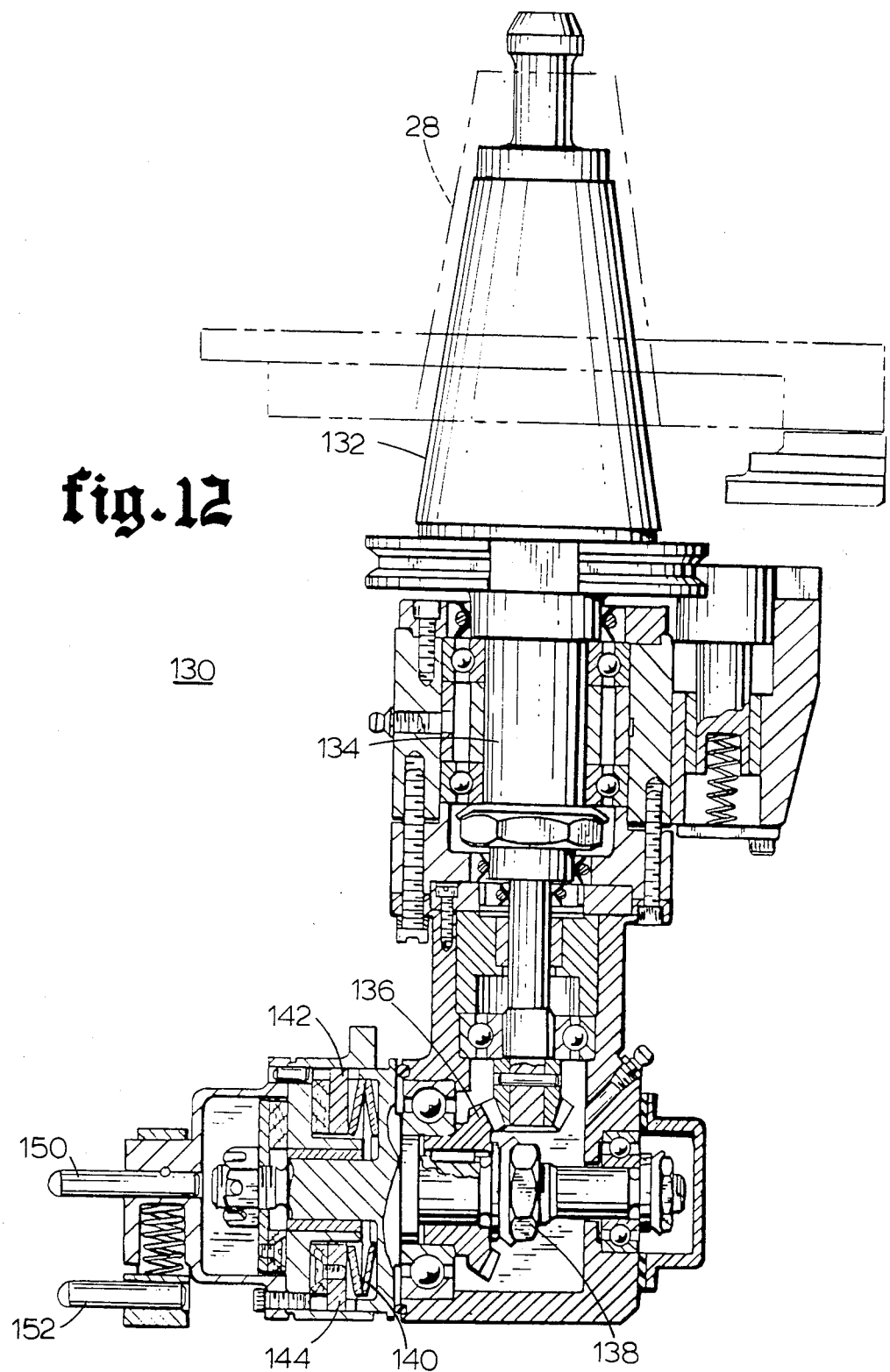
FIG. 12 is a sectional view of the workpiece turnover attachment.
Figure 13:
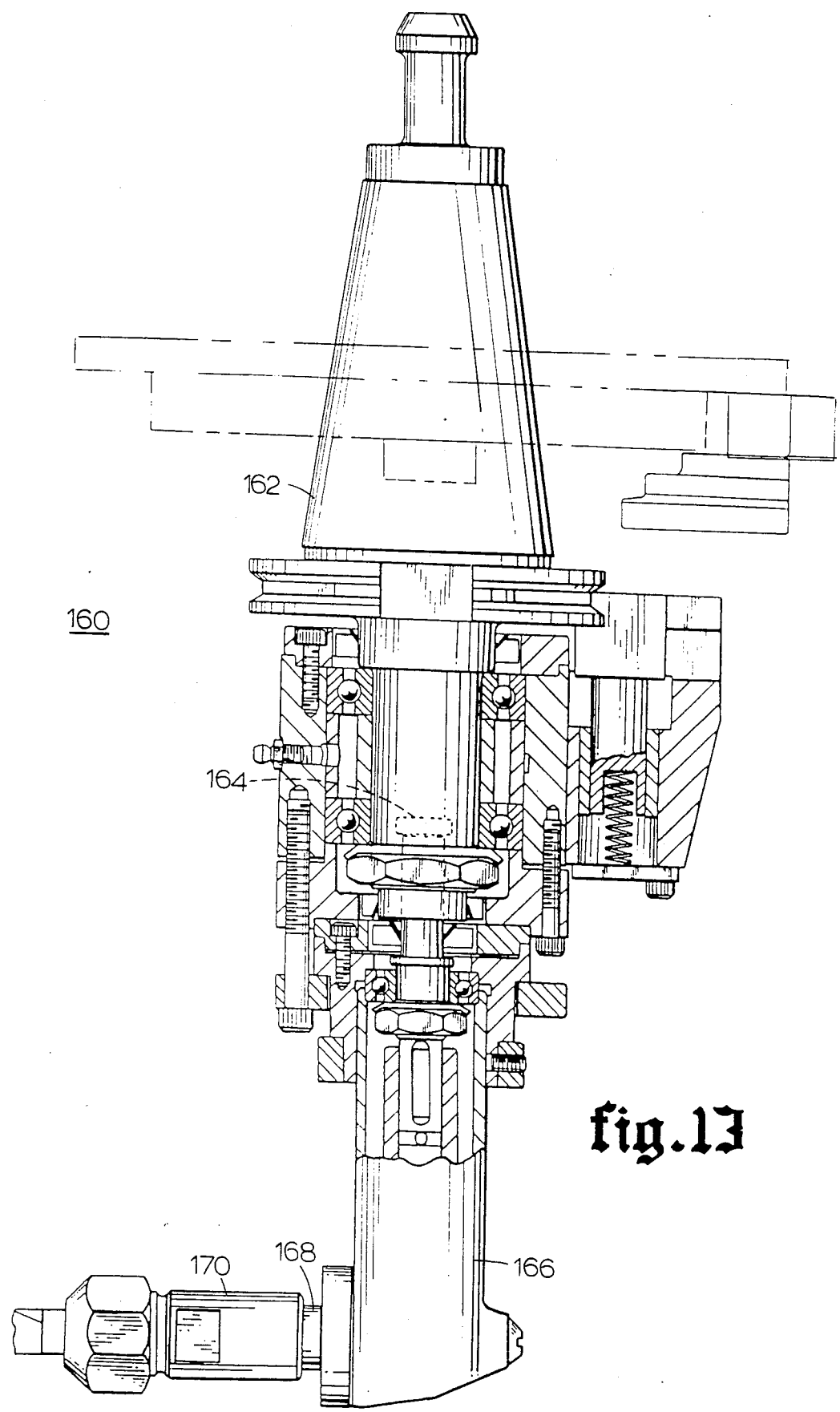
FIG. 13 is a sectional view of the right angle drill.

Referring to FIG. 12, the workpiece turnover attachment 130 consists generally of a tool head 132 designed to fit into the chuck of the rotatable spindle 28. A vertical rotating shaft 134 is attached to the tool head 132 which is also connected through a right angle gear box 136 to a horizontal shaft 138. The horizontal shaft 138 has connected thereto a clutch assembly 140 and controlled stops 142 and 144 that limit rotation through 180°. Attached to the horizontal shaft are two ball nose pins 150 and 152, one of which is fixed, while the other is mounted on slides and is spring loaded. Both pins 150 and 152 are designed to enter pre-drilled holes, 146, in the side of the workpiece, the spring loaded pin 152 exerting a force thus holding the part firmly. Once the pins have been inserted into the workpiece, the rotatable spindle is then raised vertically and the spindle is rotated 180° utilizing the clutch assembly 140 and stops 142 and 144 to turn the workpiece over. The workpiece is then lowered to the rotary indexing table 58 by the drive head 26. The workpiece turnover attachment 130 is then exchanged by the tool changing arm with the adjustable torque driver 102, and secured to the rotary indexing table 58.

The apertures, 146, in the workpiece that are utilized by the workpiece turnover attachment may be drilled by a right angle drill 160 that is designed to be stored in the tool changing carrousel 34 and mounted in the chuck of the rotatable spindle 28. The right angle drill 160 can machine the workpiece at a right angle to the axis of the rotatable spindle 28 without rotation of the trunnion worktable 16. The right angle drill also allows drilling of work pieces in hard to reach places such as inside flanges, etc.

The right angle drill 160 is generally of the type disclosed in the co-pending U.S. patent application Ser. No. 06/681,660, filed Dec. 14, 1984, assigned to the assignee of the instant application. Inasmuch as the right angle drill 160 is of the type disclosed in the aforementioned patent to which reference is made to incorporate herein the complete description of structure and operation, the following description is limited to those portions essential to the present invention.

The right angle drill 160 is generally comprised of a conventional tool head 162 connected to a vertical rotatable shaft 164 which rotates with the rotatable spindle 28. Connected to the vertical rotatable shaft 164 through a right angle gear box 166 is a horizontal shaft 168 that supports a chuck 170 for mounting cutting tools. Using this right angle drill 160, automatic machining may be accomplished at right angles to the workpiece by moving the workpiece supported by the trunnion worktable against the drill. When machining workpieces having unique configurations, oftentimes apertures have to be drilled that do not align with the traditional axes of a numerical controlled machine. The right angle drill 160 gives the user additional flexibility to machine workpieces having irregular shapes.

It can readily be seen that there is provided by this invention a unique and novel automated machine tool that is fully automated and completely integrates all necessary machine functions to machine a workpiece without human intervention.

Although there has been illustrated and described specific detail and structure of operation, it is clearly understood that the same were merely for purposes of illustration and that changes and modifications may be readily made therein by those skilled in the art without departing from the spirit and scope of this invention.

What we claim is:
1. An automated machining center, comprising:
   (a) A frame;
   (b) A movable worktable means connected to the frame for supporting a workpiece and movable longitudinally and latitudinally to position the workpiece at a desired point in a horizontal plane;
   (c) Pivot means connected to each end of the movable worktable means for rotation of the movable worktable means about its horizontal axis;
   (d) A rotary indexing means mounted on the movable worktable means for rotating the workpiece in response to the horizontal position of the movable worktable means;
   (e) A material handling means connected to the worktable means for storing a stack of material to be machined, transporting a workpiece from the stack of material to a machining station on the movable worktable means, and a workpiece pickup means for picking up the workpiece and transporting the workpiece to the rotary indexing means on the movable worktable means; and
   (f) A workpiece turnover means for removing the workpiece from the worktable, turning the workpiece over, and returning the workpiece to the worktable;
   (g) A rotatable spindle means connected to the frame for supporting a cutting tool and rotating the cutting tool at a predetermined speed rate to machine the workpiece;
   (h) A tool changing means connected to the frame for storing tools and exchanging the tool supported in the rotatable spindle means with one of a multitude of different tools stored therein;
   (i) An adjustable torque driving means configured to be stored in the tool changing means and rotated by the rotatable spindle means such that the adjustable torque driving means drives bolts into the workpiece to secure the workpiece to the movable worktable means and removes bolts from the workpiece to detach the workpiece from the movable worktable means after machining;
   (j) A programmable control means disposed to control the movable worktable means, the rotatable indexing means, the rotatable spindle means, the workpiece turnover means, the tool changing means, the material handling means, the adjustable torque driving means, and the workpiece pickup means; for automatically loading the workpiece onto the worktable, performing multiple machining functions on the workpiece, and unloading the workpiece from the worktable after machining.

2. An automated machining center as recited in claim 1 wherein the rotary indexing means is generally comprised of:
   (a) A base plate assembly mounted on the movable worktable means having a center pin connected thereto;
   (b) A circular table having an opening at its center rotatably mounted over the center pin on the base plate assembly;
   (c) The circular table further comprising an indexing aperture in its surface disposed to receive an indexing tool supported in the rotatable spindle such that the indexing tool causes rotation of the circular table upon movement of the movable worktable in its horizontal plane; and (d) Clamping means connected to the baseplate assembly for clamping the circular table in a fixed position after rotation.

3. An automated machining center as recited in claim 1 wherein the material handling means comprises:

(a) Storage means mounted on the movable worktable means for storing a stack of material to be machined;

(b) Guide rails mounted on the movable worktable means for transporting a workpiece stored in the storage means and from the storage means to a machining station;

(c) A shuttle arm connected to the guide rails disposed to move along the guide rails and drive a workpiece from the storage means over the guiderails to the machining station;

(d) A latching pin connected to the shuttle arm to facilitate movement of the shuttle arm along the guide rails;

(e) An indexing tool disposed to be stored in the tool changing means and supported by the rotatable spindle means for making connection with the latching pin and causing movement of the shuttle arm to drive a workpiece over the guide rails to the machining station.

4. An automated machining center as recited in claim 3 wherein the workpiece pickup attachment is disposed to be stored in the tool changing means and supported by the rotatable spindle means for removing the workpiece from the movable worktable.

5. An automated machining center as recited in claim 1 wherein the work piece turnover means is generally comprised of:

(a) tool head disposed to be supported and rotated by the rotatable spindle means;

(b) a first drive shaft connected to the tool head;

(c) a right angle gearing means connected to the first drive shaft;

(d) a second drive shaft connected to the right angle gearing means such that the second drive shaft is generally perpendicular to the first drive shaft and is caused to rotate by the rotation of the first drive shaft via the right angle gearing means;

(e) a gripping means connected to the second drive shaft means for gripping the work piece and supporting it thereon; and (f) a clutch and stop means for releasing the gripping means from the second drive shaft and stopping rotation after 180°.

6. An automated machining center as recited in claim 1 generally comprised of:

(a) a tool head disposed to be supported and rotated by the rotatable spindle means;

(b) an adjustable torque release assembly disposed to be connected to the tool head;

(c) a drive bit means for supporting and driving a bolt or screw connected to the adjustable torque release assembly for rotation thereby; and (d) a biasing means for biasing the adjustable torque release assembly into engagement with the tool head to be driven thereby such that the adjustable torque release assembly is caused to slip and be released from the tool head when the torque applied to the bolt exceeds the force of the biasing means.

7. An automated machining center as recited in claim 1 wherein the workpiece pickup means is generally comprised of:

(a) a tool head disposed to be supported by the rotatable spindle means;

(b) a generally hollow support bracket connected to the tool head;

(c) a spring biased gripper pad connected to one end of the generally hollow support bracket;

(d) a telescoping bracket mounted within the generally hollow support bracket having two fixed gripper pads connected thereto opposing the spring-biased gripper pad;

(e) a locking means for locking the telescoping bracket in a fixed position with respect to the generally hollow bracket such that the distance between the spring biased gripper pad and the fixed gripper pads can be adjusted to accommodate varying sizes of workpieces; and (f) the biasing of the spring biased gripper pad is such that when the work piece pickup means is forced against a workpiece by the rotatable spindle means, the workpiece is retained within the gripper pads.

* * * * *

UNITED STATES PATENT OFFICE
CERTIFICATE OF CORRECTION

PATENT NO. : 4,571,814
DATED : 25 February 1986
INVENTOR(S) : Kenneth J. Palfery et al It is certified that error appears in the above-identified patent and that said Letters Patent are hereby corrected as shown below:

On the front page, line after "William R. Briggs", insert Attorney, Agent, or Firm - Benjamin Hudson, Jr.; George W. Finch; John P. Scholl In Claim 6, column 10, line 8, after "1" insert wherein the adjustable torque driving means is Signed and Sealed this Tenth Day of February, 1987

Attest:

DONALD J. QUIGG

Attesting Officer

Commissioner of Patents and Trademarks